(12) United States Patent
Puckett et al.

(10) Patent No.: US 10,451,806 B1
(45) Date of Patent: Oct. 22, 2019

(54) RF FREQUENCY SYNTHESIS BASED ON OFFSET OPTICAL FREQUENCY COMBS IN RING RESONATORS

(71) Applicant: Honeywell International Inc., Morris Plains, NJ (US)

(72) Inventors: Matthew Wade Puckett, Scottsdale, AZ (US); Neil A. Krueger, Saint Paul, MN (US); Jianfeng Wu, Tucson, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/996,039

(22) Filed: Jun. 1, 2018

(51) Int. Cl.
*G02B 6/293* (2006.01)

(52) U.S. Cl.
CPC ............... *G02B 6/29323* (2013.01)

(58) Field of Classification Search
CPC .................. G02B 6/29338; G02B 6/29323
See application file for complete search history.

(56) References Cited

U.S. PATENT DOCUMENTS

| | | | |
|---|---|---|---|
| 7,085,499 B2 | 8/2006 | Yap et al. | |
| 8,111,722 B1 | 2/2012 | Maleki et al. | |
| 8,315,282 B2 | 11/2012 | Huber et al. | |
| 9,490,605 B2 | 11/2016 | Gaeta et al. | |
| 9,618,392 B2 | 4/2017 | Kippenberg et al. | |
| 9,891,500 B1 | 2/2018 | Chu et al. | |
| 10,038,301 B1* | 7/2018 | Eggleston | H01S 5/0657 |
| 2004/0032886 A1* | 2/2004 | Taghavi-Larigani | H01S 5/1032 372/20 |
| 2004/0062483 A1* | 4/2004 | Taghavi-Larigani | G02B 6/12007 385/39 |
| 2006/0013273 A1* | 1/2006 | Menon | H01S 5/026 372/32 |
| 2008/0285606 A1 | 11/2008 | Kippenberg et al. | |
| 2009/0174931 A1* | 7/2009 | Huber | H01S 3/1106 359/340 |
| 2009/0180729 A1* | 7/2009 | Rasras | G02B 6/12007 385/11 |
| 2012/0063484 A1* | 3/2012 | Goddard | G02B 6/12007 372/94 |
| 2012/0189025 A1* | 7/2012 | Zheng | H01S 5/1071 372/20 |
| 2012/0294319 A1 | 11/2012 | Maleki et al. | |

(Continued)

OTHER PUBLICATIONS

Dutt et al, "On-chip Dual Comb Source for Spectroscopy", Physics Optics, Dated Nov. 23, 2016, pp. 1-12.

(Continued)

*Primary Examiner* — Thomas A Hollweg
*Assistant Examiner* — Mary A El-Shammaa
(74) *Attorney, Agent, or Firm* — Fogg & Powers LLC

(57) ABSTRACT

An optical frequency comb generator device is disclosed. In one implementation, the optical frequency comb generator device comprises a bus waveguide, at least a first optical ring resonator optically coupled to the bus waveguide, and at least a first grating located on the first optical ring resonator opposite from the bus waveguide. The first optical ring resonator and the first grating are configured to generate counter-propagating optical frequency combs that are offset from each other at a controllable bandwidth.

20 Claims, 5 Drawing Sheets

(56) References Cited

U.S. PATENT DOCUMENTS

| | | | | |
|---|---|---|---|---|
| 2014/0376000 A1* | 12/2014 | Swanson | ............ | G01B 9/02091 356/479 |
| 2016/0134078 A1* | 5/2016 | Gaeta | .................. | H01S 3/06791 372/6 |
| 2017/0207600 A1* | 7/2017 | Klamkin | ............. | H01S 5/02292 |
| 2018/0026426 A1* | 1/2018 | Kawakita | ............... | G02B 5/284 372/20 |
| 2018/0081115 A1* | 3/2018 | Puckett | .................. | G02B 6/125 |

OTHER PUBLICATIONS

Feced et al, "An Efficient Inverse Scattering Algorithm for the Design of Nonuniform Fiber Bragg Gratings", IEEE Journal of Quantum Electronics, Dated Aug. 1999, pp. 1105-1115, vol. 35, No. 8, Publisher: IEEE.

Jung et al, "Optical Frequency Comb Generation From Aluminum Nitride Micro-ring Resonator", Optics Letters, Dated 2013, pp. 2810-2813, vol. 38, Issue 15, Publisher: Optical Society of America.

Kuyken et al, "An Octave-spanning Mid-infrared Frequency Comp Generated in a Silicon Nanophotonic Wire Waveguide", Nature Communications, 6:6310, Dated Feb. 20, 2015, pp. 1-6, Publisher: Macmillan Publishers Limited.

Ma et al, "Optical Phased Array Radiating Optical Vortex with Manipulated Topological Charges", Optics Express, Dated Feb. 23, 2015, pp. 4873-4879, vol. 23, No. 4, Publisher: Optical Society of America.

Miller et al, "Tunable Frequency Combs Based on Dual Microring Resonators", Optics Express, Dated Aug. 10, 2015, pp. 21527-21540, vol. 23, No. 16, Publisher: Optical Society of America.

Noordin et al, "Uniform Circular Arrays for Phased Array Antenna", 2011 Loughborough Antennas & Propagation Conference, Loughborough, UK, Dated Nov. 14-15, 2011, Retrieved Jun. 26, 2014, pp. Cover, 1-4, Publisher: IEEE.

Okawachi et al, "Octave-spanning Frequency Comb Generation in a Silicon Nitride Chip", Physics Optics, Dated Jul. 27, 2011, pp. 1-3, Publisher: Optical Society of America.

Wang et al, "Mid-infrared Optical Frequency Combs at 2.5μm Based on Crystalline Microresonators", Nature Communications, 4:1345 doi: 10.1038/ncomms2335, Dated Jan. 2013, Retrieved Jun. 2, 2014, pp. 1-8, Publisher: Macmillan Publishers Limited.

* cited by examiner

RF FREQUENCY SYNTHESIS BASED ON OFFSET OPTICAL FREQUENCY COMBS IN RING RESONATORS

BACKGROUND

Devices capable of producing stable, low noise radio frequency (RF) signals in the MHz to GHz range are highly sought after for a large number of communications applications. Currently, optical frequency combs offer one of the most high-performance ways of generating ultra-low noise RF signals. In order for optical frequency combs to operate, it is necessary for the combs to be octave-spanning to down-convert from higher optical frequencies to lower optical frequencies. For example, the current state of the art is to use an optical frequency comb that spans an entire octave in order to generate an RF signal. The efficiency for this process is low, however, since the majority of the signal is not used and thus requires high power optical pumps.

SUMMARY

An optical frequency comb generator device is disclosed. In one implementation, the optical frequency comb generator device comprises a bus waveguide, at least a first optical ring resonator optically coupled to the bus waveguide, and at least a first grating located on the first optical ring resonator opposite from the bus waveguide. The first optical ring resonator and the first grating are configured to generate counter-propagating optical frequency combs that are offset from each other at a controllable bandwidth.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
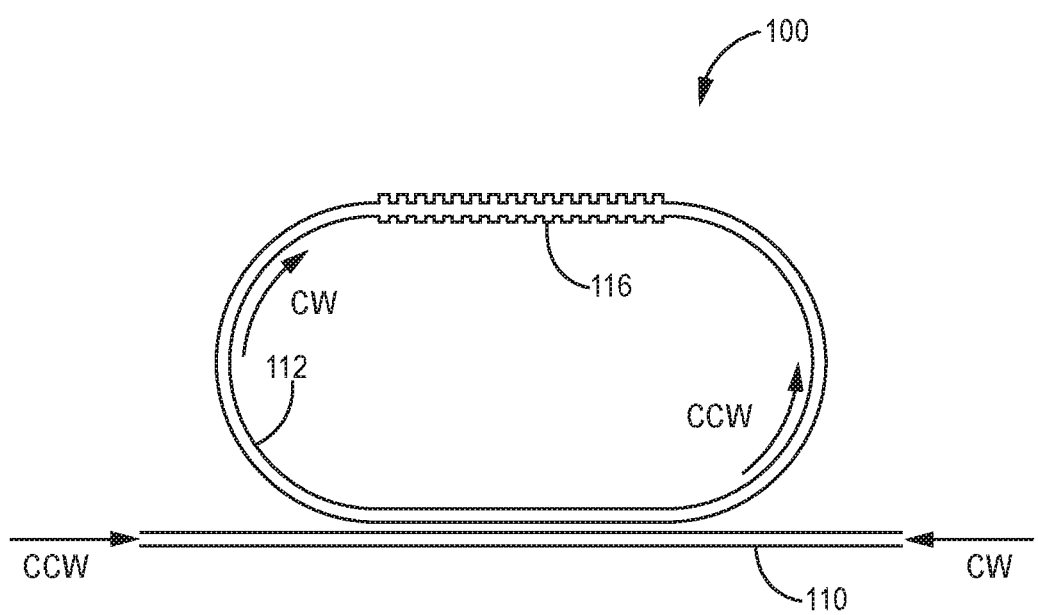
FIG. 1 is a schematic diagram of an optical frequency comb generator device with a single ring resonator, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for radio frequency (RF) synthesis based on offset optical frequency combs in ring resonators is disclosed herein. The present system and method can be employed to generate a predetermined RF signal by beating two optical frequency combs with a relative frequency offset to each other. For example, the present method can be used to generate a stable, low noise RF signal in the MHz to GHz range by beating the two optical frequency combs with the relative frequency offset.

As compared to the state of the art, the present approach does not require the optical frequency combs to span an entire octave in order to generate an RF signal. Instead, the RF signal is determined by the relative frequency offset between the two combs. This improves upon the state of the art in two ways. First, the optical resonator device used to generate the combs does not have to be dispersion engineered because the comb does not have to be broad in the spectral domain. This allows the geometry of the resonator device to be optimized instead for low loss, which reduces the optical pump power required to operate the device. Second, the required operating power is further reduced because the comb lines used to generate the RF signal are closer to the pump, and so the comb can exist closer to its threshold optical pump power.

The present approach further removes the requirement for an optical or electrical frequency doubler, and is therefore expected to have a reduced cost of production. In addition, the frequency of the generated signal is widely tunable from a few MHz to hundreds of GHz, whereas that of conventional comb-based RF synthesizers is more strictly limited and less easily controlled.

In one exemplary embodiment, an optical frequency comb generator device can be made by coupling two optical ring resonators to one another using a grating coupler, such as a grating-assisted contra-directional coupler, for example. The grating coupler can be engineered to have a broad, uniform-strength coupling band, outside of which negligible coupling occurs. Within the coupling band, the resonances are split by an amount corresponding to the degree of coupling between the two ring resonators. Because the coupling can be controlled via the grating, so too can the resonance splitting.

When two counter-propagating pump beams are coupled into the resonator rings, each corresponding pump can be locked to one of the two split resonances, generating a corresponding comb. If the two combs are combined and directed to a common optical detector, the electrical signal generated by the detector will contain an extremely sharp peak at the splitting frequency. Further narrowing of the electrical signal can be achieved, if necessary, by filtering the pump frequencies out of the optical signal in a region outside of the resonator rings.

The two optical pumps used to generate the two offset frequency combs can, in general, come from separate lasers and be uncorrelated, or alternatively, can come from the same laser and be correlated. If two correlated pumps are used, the resulting RF signal that is generated is expected to have lower phase noise and a narrower corresponding linewidth.

The present system can be implemented to produce high performance, narrower linewidth, RF oscillators, for example. The narrower linewidths are produced because of the higher power in the comb lines and are intrinsic to the nonlinear wavelength conversion process in an optical resonator.

Further details of various embodiments are described hereafter with reference to the drawings.

FIG. 1 illustrates an optical frequency comb generator device 100, according to one embodiment. The comb generator device 100 includes a bus waveguide 110, and at least one optical ring resonator 112 optically coupled to bus waveguide 110. A grating 116, such as a Bragg grating, is located on ring resonator 112 opposite from bus waveguide 110. In one embodiment, the ring resonator 112 is a microresonator, which can be formed using standard microfabrication techniques.

When a Bragg grating is used, it can be designed to give uniform frequency splitting over a wide range. The Bragg grating can be inversely-designed to have a uniform grating strength over a given wavelength range. An arbitrary transmission spectrum for the Bragg grating can be designed by defining what is needed in the Fourier domain, and then an inverse Fourier transform can be performed to obtain a spatial profile.

The ring resonator 112 with grating 116 is configured to generate first and second counter-propagating optical frequency combs that are offset from each other at a controllable bandwidth. For example, grating 116 is operative to couple a counter-clockwise (CCW) propagating mode of ring resonator 112 to a clockwise (CW) propagating mode of ring resonator 112, when two counter-propagating light beams are coupled into comb device 100 through opposite ends of bus waveguide 110. This results in the generation of the first and second counter-propagating optical frequency combs that are offset from each other.

Figure 2:
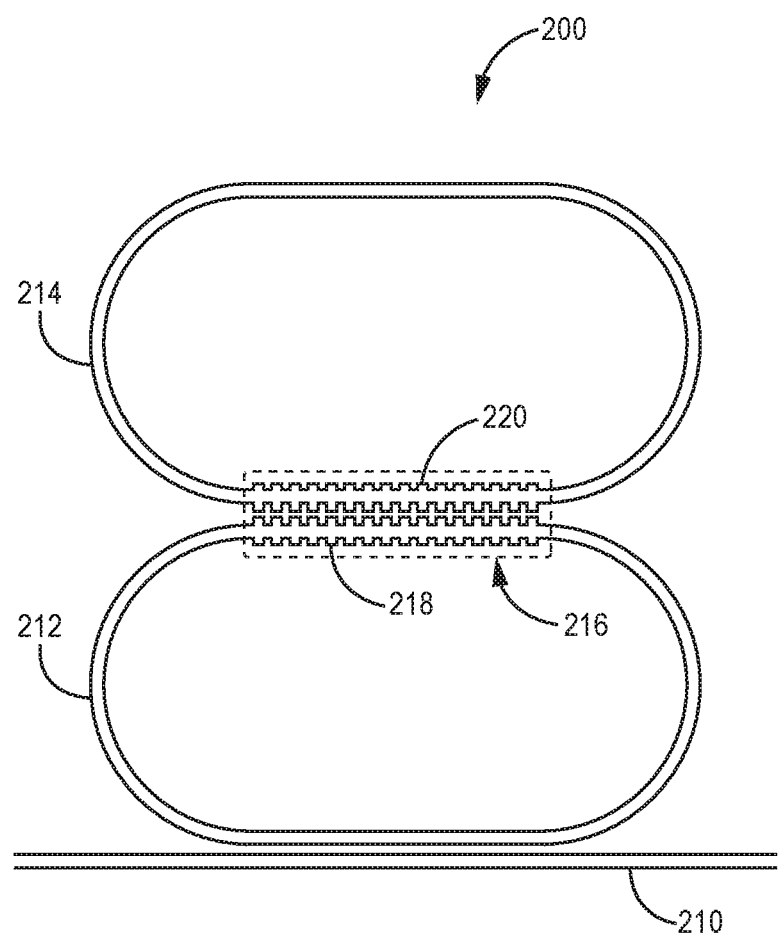
FIG. 2 is a schematic diagram of an optical frequency comb generator device with coupled dual ring resonators, according to another embodiment.

FIG. 2 depicts an optical frequency comb generator device 200, with coupled dual ring resonators, according to another embodiment. The comb generator device 200 includes a bus waveguide 210, and a first optical ring resonator 212 optically coupled to bus waveguide 210. A second optical ring resonator 214 is optically coupled to first optical ring resonator 212 by a grating coupler 216, such as a grating-assisted contra-directional coupler, which is located opposite from bus waveguide 210. The grating coupler 216 is formed by adjacent grating structures 218 and 220, such as Bragg gratings, located respectively on ring resonators 212 and 214. In one embodiment, the ring resonators 212 and 214 are microresonators, which can be formed using standard microfabrication techniques. The grating structures 218 and 220 can be inversely-designed to have a uniform grating strength over a given wavelength range.

The grating coupler is operative to couple a CCW propagating mode to a CW propagating mode, when two counter-propagating light beams are coupled into device 200 through bus waveguide 210. This results in ring resonators 212 and 214 generating first and second counter-propagating optical frequency combs that are offset from each other at a controllable bandwidth.

While the embodiment of FIG. 2 is directed to coupled dual ring resonators, it should understood that additional ring resonators (more than two) can be employed together in a coupled arrangement, to provide other optical frequency comb generator devices.

Figure 3A:
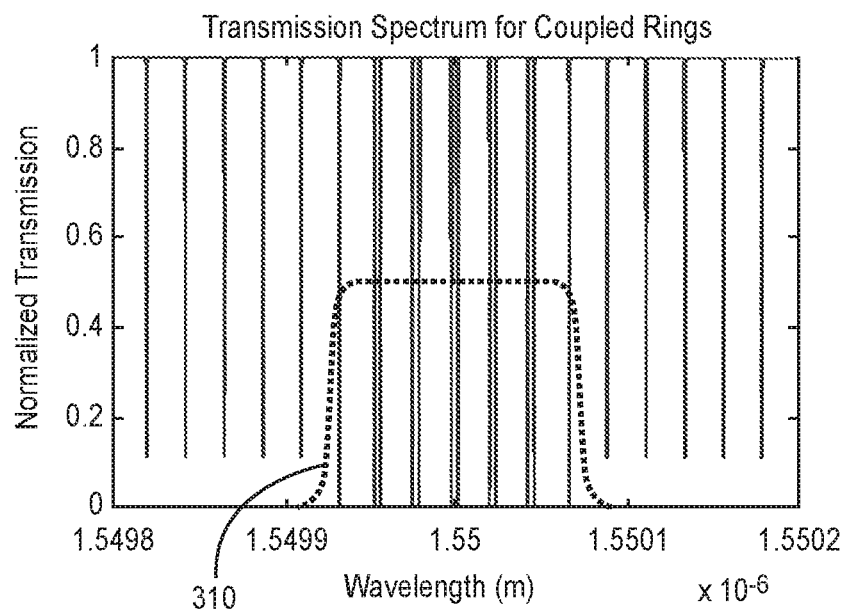
FIGS. 3A and 3B are plots from simulations showing transmission spectra for coupled dual ring resonators using different grating couplers.
Figure 3B:
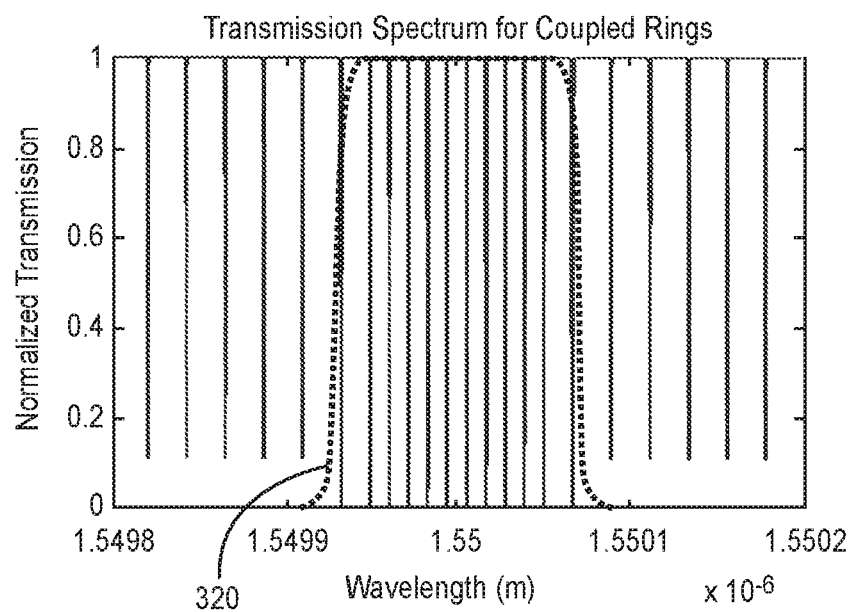

FIGS. 3A and 3B are plots from simulations showing transmission spectra for coupled dual ring resonators using different grating couplers. In these simulations, the same resonators were used, but with different grating couplers, for each set of coupled dual ring resonators, to demonstrate grating coupler performance. The term "kappa" as used herein represents the coupling coefficient of each grating coupler.

FIG. 3A shows the transmission spectrum for a first set of coupled dual ring resonators (first and second resonators), when a weaker grating coupler is used that is operative to couple only a portion of the light from the first resonator to the second resonator and vice versa. The transmission spectrum of FIG. 3A indicates that a weaker coupling takes place in a stop band 310 (kappa=0.5), when the weaker grating coupler is used.

FIG. 3B shows the transmission spectrum for a second set of coupled dual ring resonators (first and second resonators), when a stronger grating coupler is used that is operative to couple all of the light from the first resonator to the second resonator and vice versa. The transmission spectrum of FIG. 3B indicates that a stronger coupling takes place in a stop band 320 (kappa 1), when the stronger grating coupler is used. Using the stronger grating coupler effectively doubles the round trip path length before the light returns to a coupler where a bus waveguide is located for the coupled dual ring resonators. Thus, all light goes around half of the first resonator, around all of the second resonator, and then the other half of the first resonator. Doubling the round trip path length has the effect of cutting the free spectral range in half, as shown in the plot of FIG. 3B, where the resonance lines are twice as close together within stop band 320 as compared to the resonance lines outside of stop band 320. Such an effect is not shown in FIG. 3A when the weaker grating coupler is used.

The foregoing simulations demonstrate that by controlling the coupling between resonances, the splitting between the resonances can be changed, and then when the resonance splits interact, this is what defines the RF output frequency. This has the benefit of forming a truncated comb that spans the spectral window of the grating, allowing a lot more power for each line of the comb and avoiding the need to amplify the combs. As the comb only forms within the spectral window, power is distributed through less of the resonances, resulting in more power through each resonance line.

Figure 4:
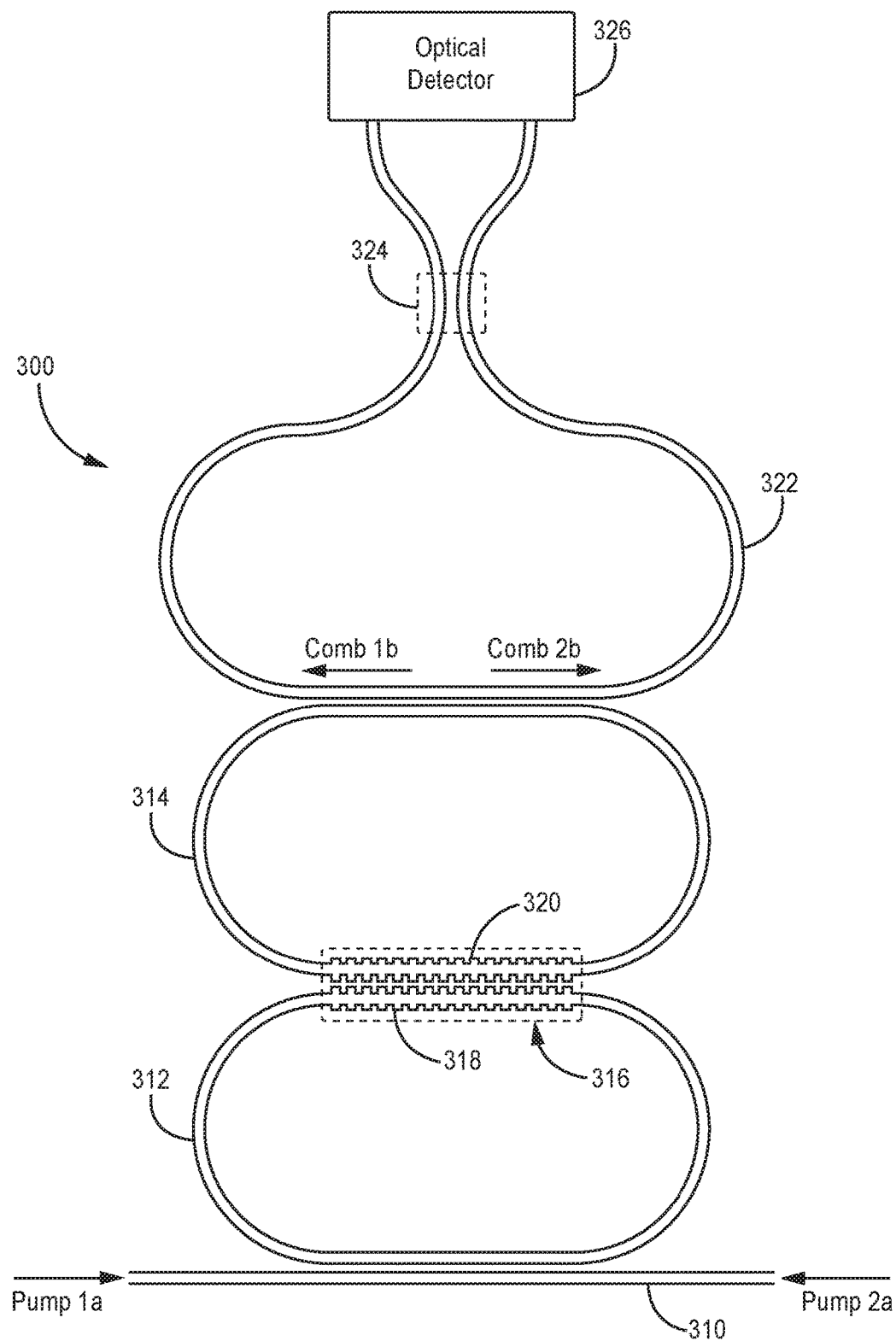
FIG. 4 is a schematic diagram of an optical frequency comb generator system, with coupled dual ring resonators, according to a further embodiment.

FIG. 4 illustrates an optical frequency comb generator system 300, with coupled dual ring resonators according to a further embodiment. The comb generator system 300 includes a bus waveguide 310, and a first optical ring resonator 312 optically coupled to bus waveguide 310. A second optical ring resonator 314 is optically coupled to first optical ring resonator 312 by a grating coupler 316, such as a grating-assisted contra-directional coupler, which is located opposite from bus waveguide 310. The grating coupler 316 is formed by adjacent grating structures 318 and 320, such as Bragg gratings, located respectively on ring resonators 312 and 314. The grating structures 318 and 320 can be inversely-designed to have a uniform grating strength over a given wavelength range.

The ring resonator 314 is optically coupled to an output waveguide 322, which is coupled to an optical detector 326 through a 50-50 coupler 324. Two optical pumps (pump 1*a* and pump 2*a*) are configured to couple counter-propagating light beam into comb generator system 300 through opposite ends of bus waveguide 310.

During operation of comb generation system 300, pumps 1*a* and 2*a* emit two counter-propagating light beams into bus waveguide 310 such that optical ring resonators 312 and 314 generate first and second counter-propagating optical frequency combs (comb 1*b* and comb 2*b*) that are offset from each other at a controllable bandwidth, and coupled into output waveguide 322. The combs 1*b* and 2*b* are beat together by coupler 324 and sent to optical detector 326 to generate an RF signal.

Figure 5:
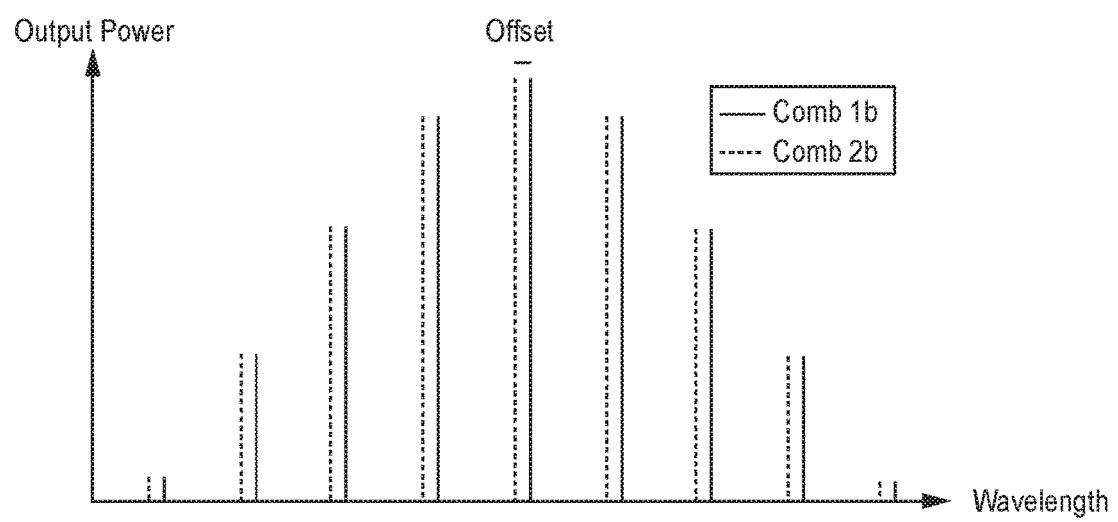
FIG. 5 is a graph of an exemplary optical spectrum of output combs, with respect to output power and wavelength, for the optical frequency comb generator system of FIG. 4.

FIG. 5 is a graph of an exemplary optical spectrum of output combs, with respect to output power and wavelength, for an optical frequency comb generator system, such as shown in FIG. 4. The graph of FIG. 5 shows that the generated combs (combs 1b and 2b) are offset with respect to each other when measured at the output waveguide, with the offset being at a fixed frequency. This allows for the measurement of all comb lines at the optical detector, or specific comb lines can be looked at while filtering out the rest of the comb lines.

EXAMPLE EMBODIMENTS

Example 1 includes an optical frequency comb generator device, comprising: a bus waveguide; at least a first optical ring resonator optically coupled to the bus waveguide; and at least a first grating located on the first optical ring resonator opposite from the bus waveguide; wherein the first optical ring resonator and the first grating are configured to generate counter-propagating optical frequency combs that are offset from each other at a controllable bandwidth.

Example 2 includes the device of Example 1, wherein the first grating comprises a Bragg grating, inversely-designed to have a uniform grating strength over a given wavelength range.

Example 3 includes the device of any of Examples 1-2, wherein the first grating is operative to couple a counter-clockwise (CCW) propagating mode to a clockwise (CW) propagating mode of the first optical ring resonator, when two counter-propagating light beams are coupled into the device through the bus waveguide.

Example 4 includes the device of any of Examples 1-3, wherein the first optical ring resonator is a microresonator.

Example 5 includes the device of any of Examples 1-4, further comprising: at least a second optical ring resonator optically coupled to the first optical ring resonator by a grating coupler; wherein the grating coupler comprises the first grating and a second grating located on the second optical ring resonator, the second grating adjacent to the first grating.

Example 6 includes the device of Example 5, wherein the first and second gratings comprise Bragg gratings, inversely-designed to have a uniform grating strength over a given wavelength range.

Example 7 includes the device of any of Examples 5-6, wherein the grating coupler comprises a grating-assisted contra-directional coupler.

Example 8 includes the device of any of Examples 5-7, wherein the grating coupler is operative to couple a CCW propagating mode to a CW propagating mode, when two counter-propagating light beams are coupled into the device through the bus waveguide.

Example 9 includes the device of Examples 5-8, wherein the first and second optical ring resonators are configured to generate the counter-propagating optical frequency combs that are offset from each other at the controllable bandwidth.

Example 10 includes the device of any of Examples 5-9, wherein the first and second optical ring resonators are microresonators.

Example 11 includes an optical frequency comb generator system, comprising: a bus waveguide; a first optical ring resonator in optical communication with the bus waveguide; a first grating located on the first optical ring resonator opposite from the bus waveguide; a second optical ring resonator in optical communication with the first optical ring resonator; a second grating located on the second optical ring resonator, the second grating adjacent to the first grating; an output waveguide in optical communication with the second optical ring resonator, the output waveguide including an optical coupler; and an optical detector in optical communication with the output waveguide through the optical coupler; wherein the first and second gratings are configured to interact as a grating coupler, the grating coupler operative to couple a CCW propagating mode to a clockwise CW propagating mode, when two counter-propagating light beams are coupled into the bus waveguide; wherein the first and second optical ring resonators are configured to generate first and second counter-propagating optical frequency combs that are offset from each other at a controllable bandwidth; wherein the optical frequency combs are coupled into the output waveguide and beat together by the optical coupler, and sent to the optical detector to generate an RF signal.

Example 12 includes the system of Example 11, wherein the first and second gratings comprise Bragg gratings, inversely-designed to have a uniform grating strength over a given wavelength range.

Example 13 includes the system of any of Examples 11-12, wherein the grating coupler comprises a grating-assisted contra-directional coupler.

Example 14 includes the system of any of Examples 11-13, wherein the first and second optical ring resonators are microresonators.

Example 15 includes a method comprising: providing an optical frequency comb generator device comprising a bus waveguide, at least a first optical ring resonator optically coupled to the bus waveguide, and at least a first grating located on the first optical ring resonator opposite from the bus waveguide; inputting two counter-propagating light beams into the device through the bus waveguide; outputting two counter-propagating optical frequency combs from the device that are offset from each other at a controllable bandwidth; and beating the optical frequency combs together to generate an RF signal.

Example 16 includes the method of Example 15, wherein the first grating is operative to couple a CCW propagating mode to a CW propagating mode, when the two counter-propagating light beams are input into the device; wherein the RF signal is a stable, narrow-linewidth RF signal in a MHz to GHz range.

Example 17 includes the method of any of Examples 15-16, wherein the device further comprises: at least a second optical ring resonator optically coupled to the first optical ring resonator by a grating coupler; wherein the grating coupler comprises the first grating and a second grating located on the second optical ring resonator, the second grating adjacent to the first grating.

Example 18 includes the method of Example 17, wherein the grating coupler comprises a grating-assisted contra-directional coupler.

Example 19 includes the method of any of Examples 17-18, wherein the grating coupler is operative to couple a CCW propagating mode to a CW propagating mode, when the two counter-propagating light beams are input into the device.

Example 20 includes the method of any of Examples 17-19, wherein the first and second optical ring resonators are microresonators.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An optical frequency comb generator device, comprising:
   a bus waveguide;
   at least a first optical ring resonator optically coupled to the bus waveguide;
   at least a first grating located on the first optical ring resonator opposite from the bus waveguide;
   a first optical pump operative to couple a first light beam into the first optical ring resonator through the bus waveguide; and
   a second optical pump operative to couple a second light beam into the first optical ring resonator through the bus waveguide;
   wherein the first and second light beams are coupled into the first optical ring resonator such that each of the first and second optical pumps is respectively locked to one of two split resonances of the first optical ring resonator;
   wherein the first optical ring resonator and the first grating are configured to generate optical frequency combs that are offset from each other at a controllable bandwidth when the first and second light beams are coupled into the first optical ring resonator.

2. The device of claim 1, wherein the first grating comprises a Bragg grating, inversely-designed to have a uniform grating strength over a given wavelength range.

3. The device of claim 1, wherein the first grating is operative to couple a counter-clockwise (CCW) propagating mode to a clockwise (CW) propagating mode of the first optical ring resonator, when the first and second light beams are coupled into the first optical ring resonator.

4. The device of claim 1, wherein the first optical ring resonator is a microresonator.

5. The device of claim 1, further comprising:
   at least a second optical ring resonator optically coupled to the first optical ring resonator by a grating coupler;
   wherein the grating coupler comprises the first grating and a second grating located on the second optical ring resonator, the second grating adjacent to the first grating.

6. The device of claim 5, wherein the first and second gratings comprise Bragg gratings, inversely-designed to have a uniform grating strength over a given wavelength range.

7. The device of claim 5, wherein the grating coupler comprises a grating-assisted contra-directional coupler.

8. The device of claim 5, wherein the grating coupler is operative to couple a CCW propagating mode to a CW propagating mode, when the first and second light beams are coupled into the first optical ring resonator.

9. The device of claim 5, wherein the first and second optical ring resonators are configured to generate the optical frequency combs that are offset from each other at the controllable bandwidth.

10. The device of claim 5, wherein the first and second optical ring resonators are microresonators.

11. An optical frequency comb generator system, comprising:
    a bus waveguide;
    a first optical ring resonator in optical communication with the bus waveguide;
    a first grating located on the first optical ring resonator opposite from the bus waveguide;
    a second optical ring resonator in optical communication with the first optical ring resonator;
    a second grating located on the second optical ring resonator, the second grating adjacent to the first grating;
    an output waveguide in optical communication with the second optical ring resonator, the output waveguide including an optical coupler;
    an optical detector in optical communication with the output waveguide through the optical coupler;
    a first optical pump operative to couple a first light beam into the first optical ring resonator through the bus waveguide in a first direction; and
    a second optical pump operative to couple a second light beam into the first optical ring resonator through the bus waveguide in a second direction;
    wherein the first and second light beams are coupled into the first optical ring resonator such that each of the first and second optical pumps is respectively locked to one of two split resonances of the first optical ring resonator;
    wherein the first and second gratings are configured to interact as a grating coupler, the grating coupler operative to couple a counter-clockwise (CCW) propagating mode to a clockwise (CW) propagating mode, when the first and second light beams are coupled into the first optical ring resonator;
    wherein the first and second optical ring resonators are configured to generate first and second counter-propagating optical frequency combs that are offset from each other at a controllable bandwidth;
    wherein the optical frequency combs are coupled into the output waveguide and beat together by the optical coupler, and sent to the optical detector to generate a radio frequency (RF) signal.

12. The system of claim 11, wherein the first and second gratings comprise Bragg gratings, inversely-designed to have a uniform grating strength over a given wavelength range.

13. The system of claim 11, wherein the grating coupler comprises a grating-assisted contra-directional coupler.

14. The system of claim 11, wherein the first and second optical ring resonators are microresonators.

15. A method comprising:
    providing an optical frequency comb generator device, comprising:
      a bus waveguide;
      at least a first optical ring resonator optically coupled to the bus waveguide;
      at least a first grating located on the first optical ring resonator opposite from the bus waveguide;
      a first optical pump operatively coupled to the first optical ring resonator through the bus waveguide; and
      a second optical pump operatively coupled to first optical ring resonator through the bus waveguide;
    inputting first and second light beams from the first and second optical pumps into the device through the bus waveguide, wherein the first and second light beams are coupled into the first optical ring resonator such that each of the first and second optical pumps is respectively locked to one of two split resonances of the first optical ring resonator;
    outputting two optical frequency combs from the device that are offset from each other at a controllable bandwidth; and
    beating the optical frequency combs together to generate a radio frequency (RF) signal.

16. The method of claim 15, wherein:
the first grating is operative to couple a counter-clockwise (CCW) propagating mode to a clockwise (CW) propagating mode, when the first and second light beams are input into the device;
wherein the RF signal is a stable, narrow-linewidth RF signal in a MHz to GHz range.

17. The method of claim 15, wherein the device further comprises:
at least a second optical ring resonator optically coupled to the first optical ring resonator by a grating coupler;
wherein the grating coupler comprises the first grating and a second grating located on the second optical ring resonator, the second grating adjacent to the first grating.

18. The method of claim 17, wherein the grating coupler comprises a grating-assisted contra-directional coupler.

19. The method of claim 17, wherein the grating coupler is operative to couple a CCW propagating mode to a CW propagating mode, when the first and second light beams are input into the device.

20. The method of claim 17, wherein the first and second optical ring resonators are microresonators.

* * * * *